(12) United States Patent
Gallagher et al.

(10) Patent No.: US 7,475,818 B2
(45) Date of Patent: Jan. 13, 2009

(54) COMBINED BATTERY AND SMART CARD

(75) Inventors: Niall Gallagher, Cambridge (CA); Ross Cruickshank, Waterloo (CA); Arkady Ivannikov, Mississauga (CA)

(73) Assignee: Research in Motion Limited, Waterloo (CA)

( * ) Notice: Subject to any disclaimer, the term of this patent is extended or adjusted under 35 U.S.C. 154(b) by 234 days.

(21) Appl. No.: 11/263,091

(22) Filed: Oct. 31, 2005

(65) Prior Publication Data
US 2007/0095910 A1 May 3, 2007

(51) Int. Cl.
*G06K 7/06* (2006.01)
(52) U.S. Cl. .................. 235/441; 235/438; 235/492
(58) Field of Classification Search ........... 235/438, 235/492, 441; 455/558
See application file for complete search history.

(56) References Cited

U.S. PATENT DOCUMENTS 6,244,894 B1 * 6/2001 Miyashita .............. 439/500

2005/0197169 A1 * 9/2005 Son ........................ 455/572

FOREIGN PATENT DOCUMENTS

| EP | 1 308 874 A2 | 5/2003 |
| GB | 2 363 882 A | 1/2002 |
| WO | WO 01/18981 A | 3/2001 |

OTHER PUBLICATIONS

Search Report from European Patent Application No. 05023766.8, 2 pages., Mar. 3, 2006.

* cited by examiner

*Primary Examiner*—Seung H Lee
(74) *Attorney, Agent, or Firm*—Jones Day; Krishna K. Pathiyal; Robert C. Liang

(57) ABSTRACT

An apparatus for seating within a battery compartment and a smart card compartment of a device, including a battery component and a smart card component. The battery component is coupled to the smart card component. The smart card component is configured to seat within a smart card compartment of a device. The apparatus is configured to be inserted into a smart card compartment of a smart card containing device substantially simultaneously with the insertion of the battery component into a battery compartment of the device. The smart card component may be a test smart card, and the battery component may be a battery emulator.

18 Claims, 7 Drawing Sheets

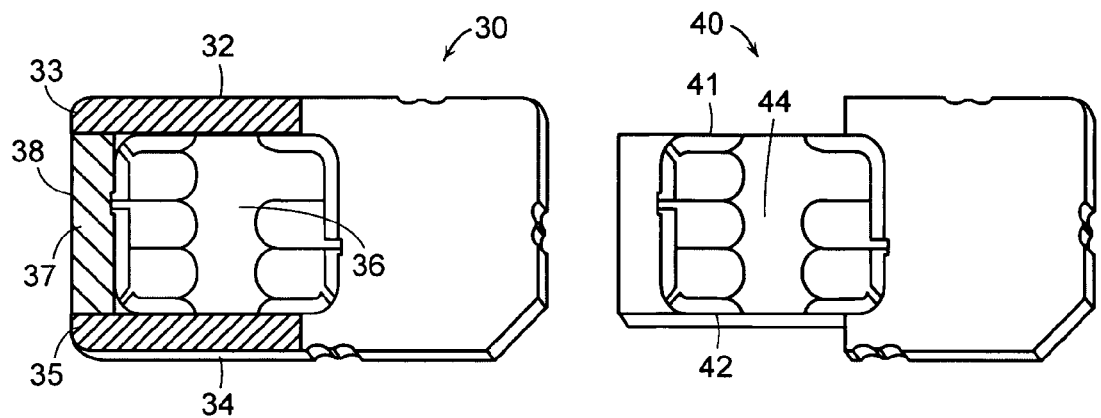
PRIOR ART
FIG. 3
FIG. 4
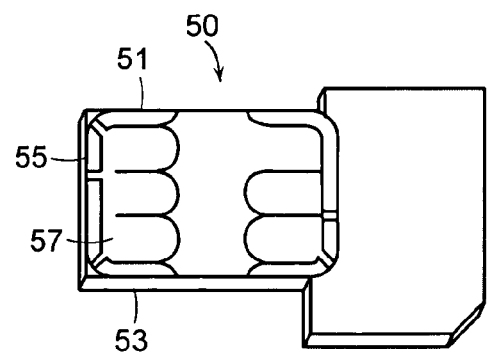
FIG. 5

COMBINED BATTERY AND SMART CARD

FIELD

The technology described in this patent document relates generally to the field of the manufacturing of smart card containing devices. More particularly, the patent document describes a combined smart card and battery that is useful in the manufacturing process of an electronic device.

BACKGROUND

Smart cards are small electronic devices that have a memory or microprocessor chip embedded within them. Smart cards can service a variety of applications and provide data portability, security, and convenience. Subscriber Identity Module (SIM) cards are a type of smart card that is usable with GSM networks. SIM cards are commonly used in smart card containing devices such as cell phones, personal data assistants, or other wireless communications devices. A SIM card contains a microchip that stores information and encrypts phone call and data transmissions. A SIM card can store data that identifies the wireless device with the user. This identification feature allows access to the user's own network service provider from various wireless devices that the SIM card may be inserted in. The SIM card may also store a user's personalized settings and data, such as phone number lists and e-mail address lists. Other types of smart cards include RUIM (Removable User Identity Module) cards that are usable with CDMA2000 (Code Division Multiple Access 2000) networks, and USIM (Universal Subscriber Identity Module) cards that are usable with UMTS (Universal Mobile Telephone Systems) networks. Smart cards are also used for data storage in other electronic devices such as digital cameras, computers, and other types of devices.

In the process of manufacturing smart card containing devices it is necessary to insert both a battery or battery emulator and a smart card in order to test the devices. The conventional method of testing smart card containing devices is to first manually insert the smart card into the smart card receptacle. More recent designs in some devices involve a recess with side edges. In these designs, the smart card is slid under the edges so it is retained in the recess by the edges. Second, the battery or battery emulator is inserted, typically by sliding it into the battery compartment. Finally, both objects are removed from the smart card containing device. For devices that retain smart cards within the area that is covered by the battery, the smart card is first slid into place and retained by its edges, or in newer devices, by a band that runs across the entire smart card. Then the battery is slid into place on top of the smart card. After testing is performed, the battery or battery emulator must be manually removed, and then the smart card must be manually removed. Thus, at least four manual actions are required to insert and remove the smart card and battery to test the device. This process is cumbersome and time consuming.

BRIEF DESCRIPTION OF THE DRAWINGS

FIG. 3 shows a perspective view of conventional smart card;

FIG. 4 shows a perspective view of an example modified smart card with horizontally trimmed edges;

FIG. 5 shows a perspective view of an example modified smart card with both horizontal edges trimmed and one vertical edge trimmed;

DETAILED DESCRIPTION

Figure 1:
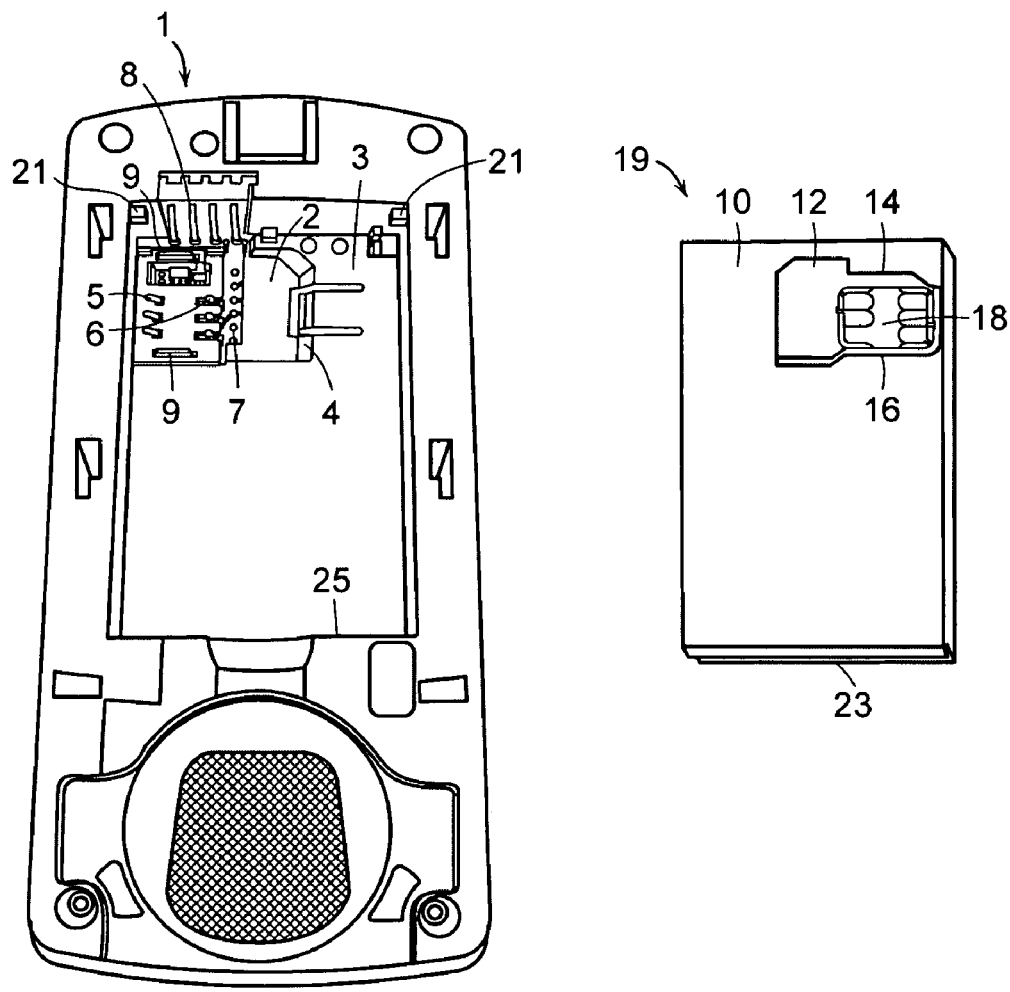
FIG. 1 shows a perspective view of an example smart card containing device with an example combined battery and smart card apparatus ready for insertion into the example smart card containing device.

In accordance with the teachings described herein, an apparatus for seating within a battery compartment and a smart card compartment of a device comprises a battery component and a smart card component. The smart card component is configured to seat within a smart card compartment of the device. The smart card component is coupled to the battery component, and the apparatus is configured to be inserted into a smart card compartment of the smart card containing device substantially simultaneously with the insertion of the battery component into a battery compartment of the device.

The smart card component may include two horizontal edges, and at least one of the horizontal edges may have a trimmed portion so that the smart card component is not lockingly retained in the smart card compartment when inserted, or so that the smart card component may be inserted into a smart card compartment in an angled, rotating motion. The smart card component may also have two vertical edges where at least one of the vertical edges of the smart card component has a trimmed portion. The at least one trimmed vertical edge of the smart card component may be trimmed about 2.0 mm relative to the smart card compartment, and the at least one trimmed horizontal edge of the smart card component may be trimmed about 2.5 mm relative to the smart card compartment.

The battery component of the device may be either a battery or a battery emulator. The smart card may be a SIM card, a USIM card, or an RUIM card. In one embodiment, the smart card component is a test smart card configured for communication with a local network.

The battery component and smart card component may be fixedly attached to one another by such means as gluing, screwing, taping, or soldering them together among other methods.

In another embodiment, a system for testing a smart card containing device comprises a device having a battery compartment and a smart card compartment, and an apparatus as described above. The apparatus is positioned in the device so that the smart card component is seated at least partially within the smart card compartment.

In the system, the smart card compartment may have an opening that is open to the battery compartment and configured to retain a smart card by its edges. The battery component may be one of a battery emulator or a battery, and the smart card component may be a test smart card having at least one horizontal edge that has a trimmed portion. The smart card component may not be lockingly retained by the smart card compartment, and the battery or battery emulator may be lockingly retained in the battery compartment. In one embodiment, neither the smart card component nor the battery are lockingly retained in the smart card containing device. The apparatus may be inserted into the battery compartment and the smart card compartment in an angled, rotating movement. The smart card may be a SIM card, a USIM card, or an RUIM card.

In a further embodiment, a method for testing a smart card containing device comprises the steps of: inserting the apparatus discussed above into the device; and performing one or more tests to determine the operability of the device. The smart card may be a SIM card, a USIM card, or an RUIM card.

The method may include the step of inserting the apparatus into a smart card containing device, the apparatus being inserted in an angled, rotating movement.

In yet another embodiment, a modified smart card comprises a smart card having horizontal edges that are dimensioned so that the smart card is not lockingly retained in a smart card holder. The smart card may be a test smart card configured for communicating with a local network. The smart card may include at least one horizontal edge that is trimmed so that the smart card has a horizontal dimension that is smaller than a smart card compartment defined in the smart card containing device.

The modified smart card may further comprise at least one vertical edge that is trimmed such that a vertical dimension of the smart card is smaller than a smart card compartment defined in a smart card containing device. The at least one vertical edge may be trimmed about 2.0 mm relative to a corresponding dimension of the smart card compartment defined in a smart card containing device, and each of the horizontal edges of the modified smart card may be trimmed about 2.5 mm relative to a corresponding dimension of a smart card compartment defined in the smart card containing device. The smart card may be a SIM card, a USIM card, or an RUIM card.

A further example includes a modified smart card comprising a smart card component having horizontal edges that are dimensioned so that the smart card component is not lockingly retained in a corresponding smart card compartment of a smart card containing device.

An example smart card system includes a smart card component having horizontal edges that are dimensioned so that the smart card component is not lockingly retained in a corresponding smart card compartment of a smart card containing device; a smart card; and means for physically connecting the smart card component to the smart card as well as means for electrically connecting the smart card component to the smart card.

An example apparatus for seating within a battery compartment and a smart card compartment of a device includes a battery component coupled to a smart card component that has contacts. Pins are electrically coupled to the contacts on the smart card component and to PCBs that are configured to engage contacts on a smart card reader.

The apparatus may include an arm portion that receives a smart card holder, wherein the holder is electrically coupled to the contacts of the smart card component and the pins are electrically coupled to the contacts through the smart card holder.

Another example method for testing a smart card containing device includes the steps of inserting the apparatus discussed in the previous paragraph into the device; and performing one or more tests to determine the operability of the device.

Examples of devices that combine a battery or battery emulator and a smart card are described herein and shown in FIG. 1. The smart card is positioned on the battery or battery emulator and modified so that it will slide into a smart card holder compartment as the battery slides into the battery compartment of a smart card containing device. This allows for a simplified and accelerated testing phase in the manufacturing process of smart card containing devices.

Some examples of smart card containing devices are cellular phones, personal data assistants, mobile e-mail devices, and digital cameras. On many of these devices it is possible to have a smart card holder compartment that is open to the battery compartment, meaning that the smart card holder compartment is further recessed into the device and is accessible from the battery compartment.

FIG. 1 shows an example system designed to improve the testing phase, and, hence, manufacturing process, of a smart card containing device. An example smart card containing device 1 is shown with a smart card holder compartment 2 that is positioned beneath and open to a battery compartment 3. Several battery contacts 8 are disposed at the top of the battery compartment 3. The smart card holder compartment 2 is recessed inwardly from the battery compartment 3. The smart card holder compartment 2 has a sloped portion 4 at the outer vertical edge that terminates toward the middle of the battery compartment 3. Various electrical contacts 5, 6, 7 are disposed in the smart card holder compartment 2. Metal ridges 9 are also disposed on the bottom of the smart card holder compartment 2 near the outer horizontal edges of the smart card holder compartment 2. The sloped portion 4 allows for insertion of a typical prior art smart card by sliding it in an angled downward and horizontal direction under the metal ridges 9. The metal ridges 9 are used to retain the smart card in position.

As part of the example system, FIG. 1 also shows an apparatus having two components: a battery component 10 and a smart card component 12. The battery component 10 and smart card component 12 are coupled to one another so that the smart card component 12 will line up with a smart card holder compartment 2 when the battery component 10 is lined up with the battery compartment 3 of the device. The smart card component 12 has trimmed horizontal edges 14, 16 so that it is insertable into the smart card compartment 2, but not retained by the metal ridges 9 of the compartment 2. The smart card component 12 is sized to seat between the ridges 9, without being retained by the ridges 9. The smart card component 12 has a contact plate 18 that contacts the smart card reader contacts 5, 6 and allows transfer of data between the smart card containing device 1 and the smart card component 12. The attached battery component 10 and smart card component 12 make up an example combined battery and modified smart card apparatus 19.

Figure 2:
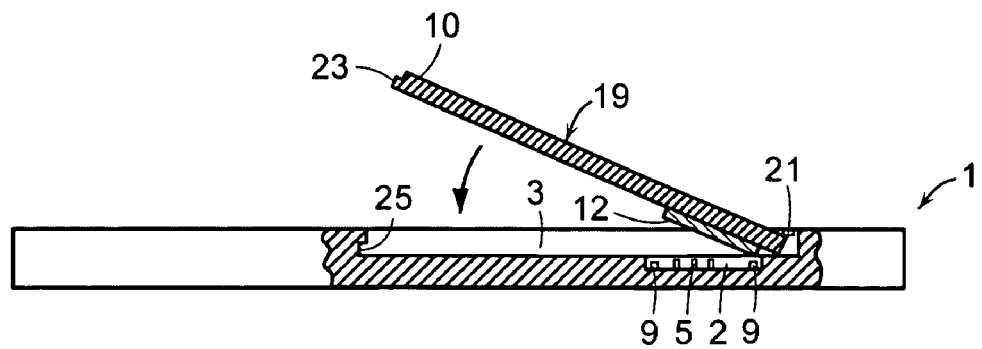
FIG. 2 shows a partial cross-sectional side view of an example combined battery and modified smart card apparatus being inserted into a device.

For insertion, the example combined battery and modified smart card apparatus 19 is turned upside down relative to what is shown in FIG. 1 so that the smart card component 12 is aligned for insertion into the smart card compartment 2. As shown in FIG. 2, for example, the combined battery and modified smart card apparatus 19 is inserted in an angled, rotating motion. Angled, rotating motion means that the combined battery and modified smart card apparatus 19 is angled downwardly toward the battery contacts 8 and then rotated downwardly into the battery compartment 3. In the depicted example, the combined battery and modified smart card apparatus 19 are also slid underneath two tabs 21 that are located at the upper corners of the battery compartment 3 when the apparatus is angled downwardly. A protrusion 23 is disposed on the surface of the battery 10 facing the opposite direction from the battery contacts 8 when the combined battery and modified smart card apparatus 19 is inserted into the device 1. The battery contacts 8 are spring loaded so that they will exert a force on the combined battery and modified smart card apparatus 19 to hold it in the battery compartment 3 by pushing the protrusion 23 underneath a recess 25 disposed in the battery compartment 3 on the surface that is opposed to the battery contacts 8.

Once inserted, the battery 10 contacts the battery contacts 8, and the contact 18 of the smart card component 12 also contacts the smart card reader contacts 5, 6 on the smart card holder compartment 2. The example smart card containing device 1 receives power from the battery 10 and data from the smart card component 12; thus providing power to the smart card containing device 1 and allowing tests to be performed on the device 1. The trimmed horizontal edges 14, 16 of the modified smart card component 12 allow the example combined battery and modified smart card apparatus 19 to be inserted substantially simultaneously.

In one example system, trimming of the horizontal edges 14, 16 relative to a prior art smart card should be enough to prevent the metal ridges 9 from impeding the movement of the smart card component 12 in the smart card holder compartment 2. In another example, the smart card component 12 may utilize trimmed horizontal edges 14, 16 that are configured such that a small amount of force is needed to insert the modified smart card component 12 between the metal ridges 9. The smart card component 12 is then removable with an equivalent amount of force. This latter embodiment provides more of a snap or press fit than the previously discussed embodiment, and may provide the user with feedback, tactile or otherwise, to know when the smart card component 12 is properly installed.

Figure 11:
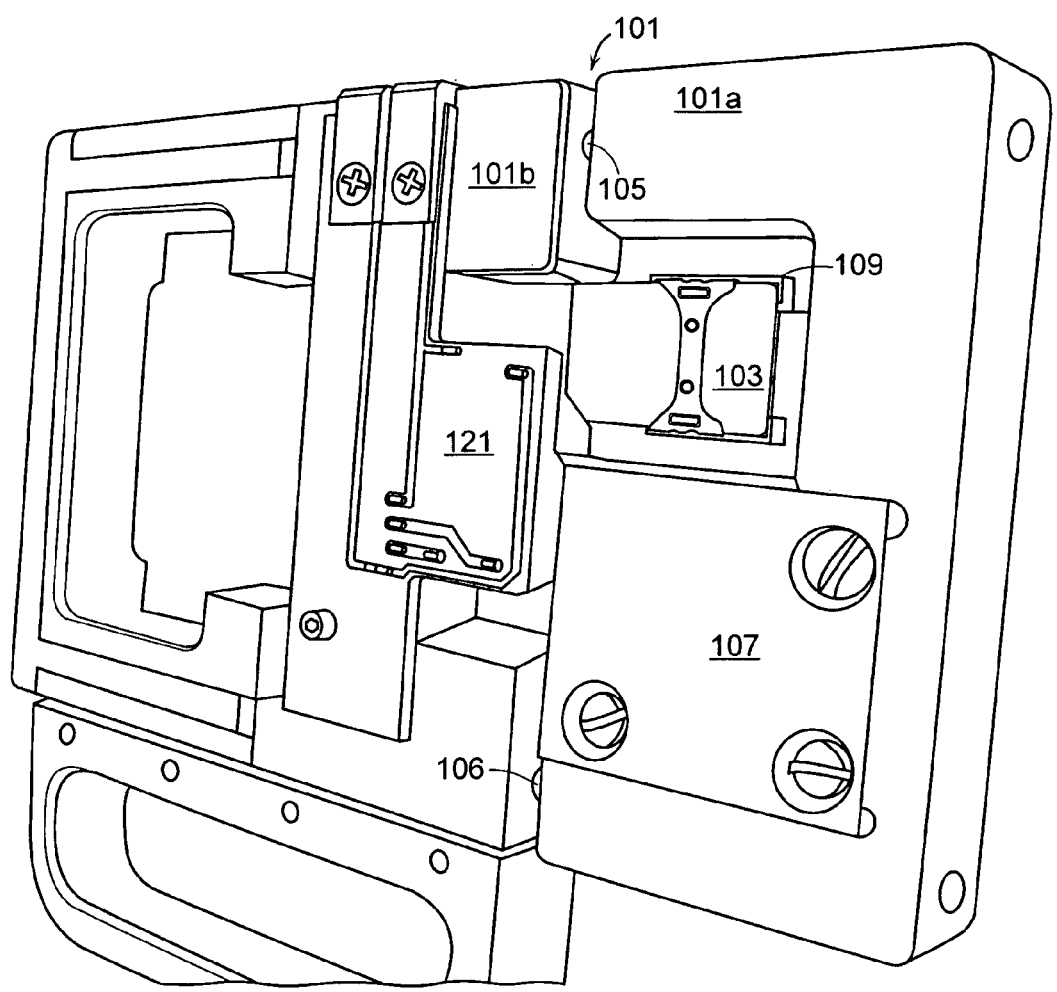
FIG. 11 shows a top view of an example combined battery emulator and smart card apparatus.
Figure 12:
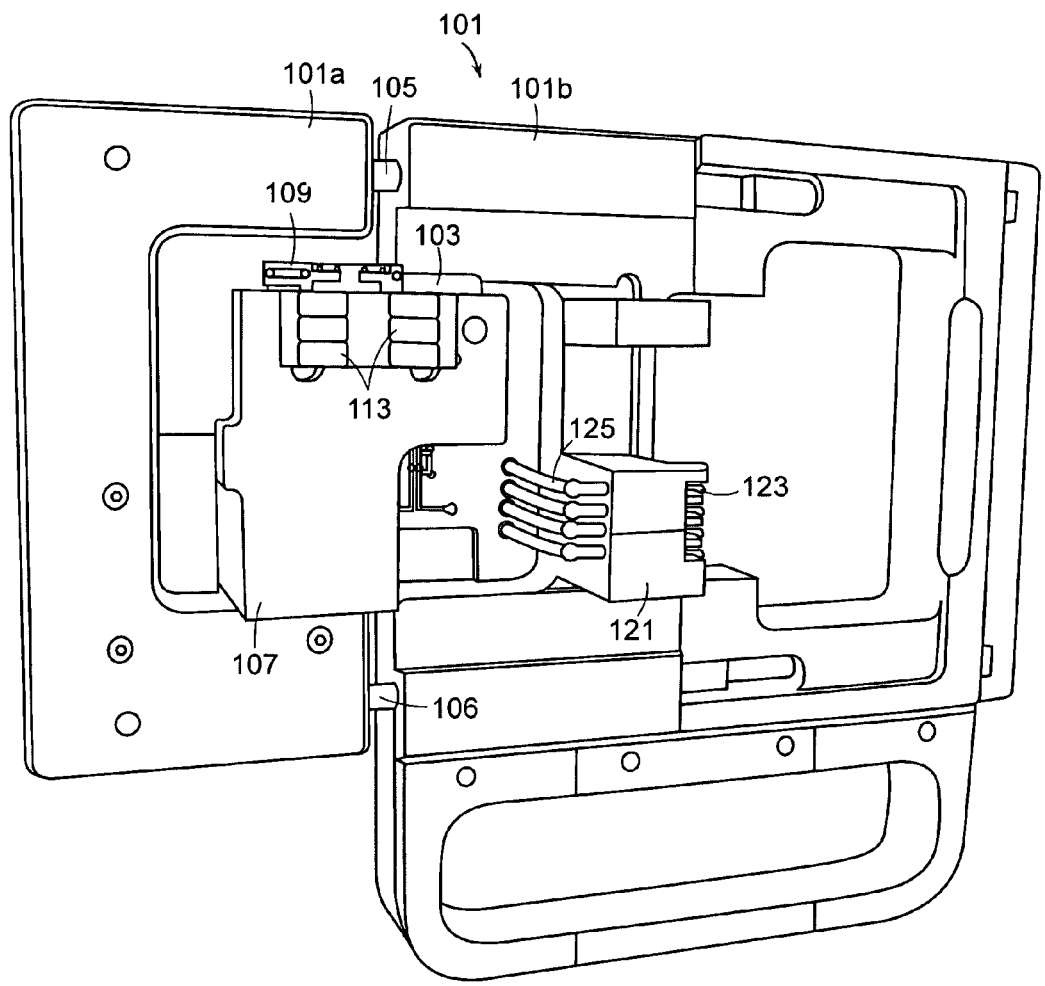
FIG. 12 shows a bottom view of the example combined battery emulator and smart card apparatus of FIG. 11.
Figure 13:
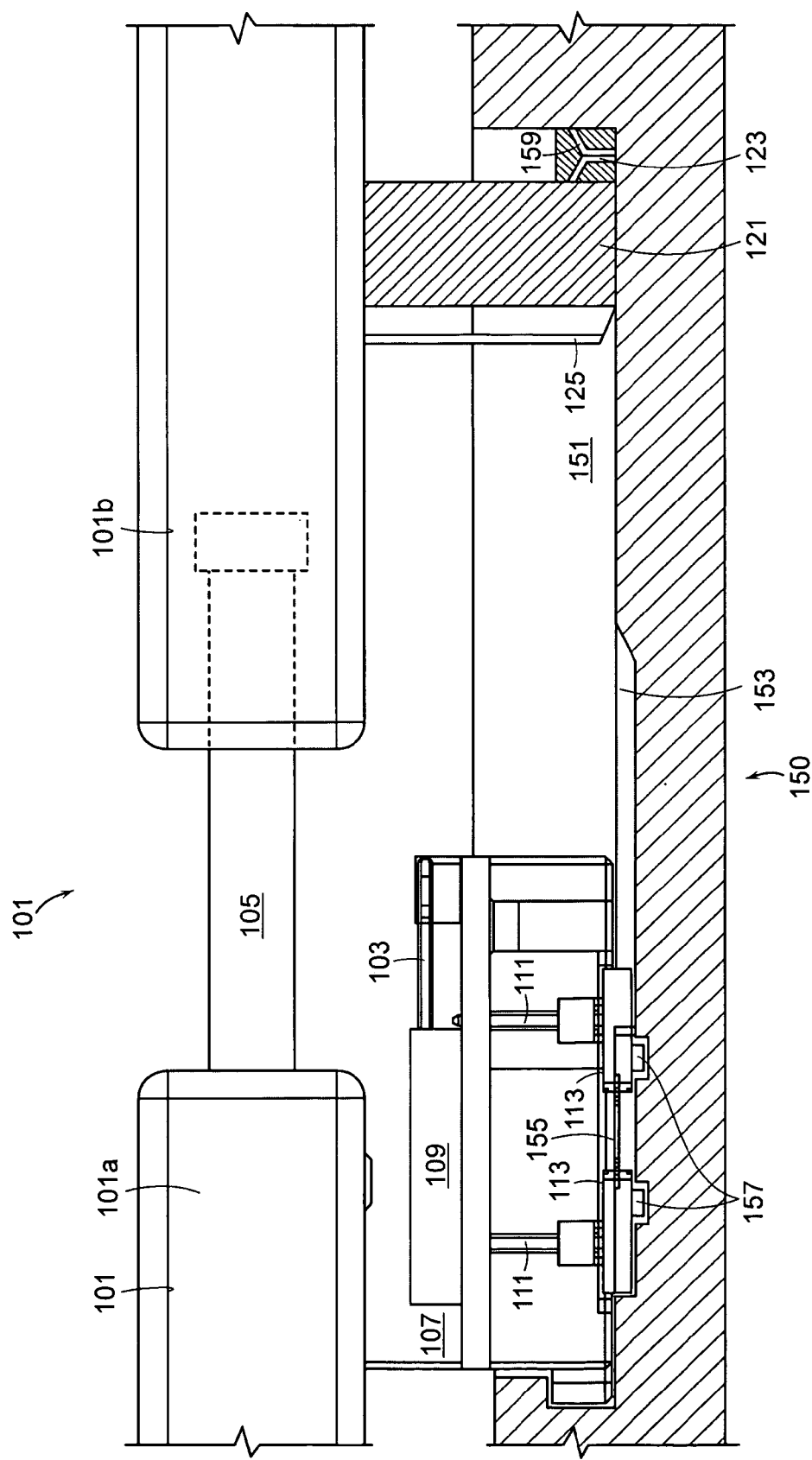
FIG. 13 shows a cross-sectional view of the example apparatus of FIGS. 11 and 12 locked into position in an example smart card containing device.

In another example, a battery emulator, an example of which is shown in FIGS. 11-13, forms the battery component 10 and is coupled to the smart card component 12. A battery emulator exhibits most of the qualities of a regular battery, but does not have any power cells. Instead it is connected to an outside power source. Because of this, a battery emulator can have a more constant voltage than a battery.

In another example, a modified test smart card forms the smart card component 12 and is coupled to the battery component 10. A test smart card is tied to a local network, rather than a network provided to end-users of smart card containing devices, such as GSM, CDMA200, or UMTS. For example, a local network may be provided in a factory setting to allow the testing of the device.

FIG. 3 shows an example conventional smart card 30, and FIGS. 4 and 5 show examples of modified smart card components 40, 50. In the conventional smart card 30, there are two areas (which are shaded in FIG. 2) 33, 35 between the outer horizontal edges 32, 34 and the contact plate 36 of the smart card 30. There is also a third area (which is also shaded in FIG. 2) 37 between the outer vertical edge 38 and the contact plate 36. In devices that retain the smart card 30 by the horizontal edges 32, 34, the smart card 30 is slid under a structure such as the metal ridges 9 shown in FIG. 1. This structure functions to hold the smart card 30 in place so it cannot be removed or is difficult to remove perpendicularly from the smart card holder compartment. A battery is then positioned on top of the smart card 30 in the battery compartment 3, and this helps prevent the smart card 30 from sliding out horizontally. In many commercial products, a smart card, such as that shown in FIG. 3 is utilized.

FIG. 4 shows an example modified smart card component 40, which is similar to the one attached to the battery 10 in FIG. 1. In the modified smart card component 40 there are trimmed edges 41, 42 that border the horizontal edges of the contact plate 44. The shaded areas 32, 35 of the prior art smart card 30 in FIG. 2 have been trimmed away in FIG. 3. In a typical smart card the trimmed edges 41, 42 are composed of plastic. There are preferably no electronics in this area. Thus, the portion of the card that is trimmed is easily removed without affecting the operation of the smart card. A typical smart card having dimensions of approximately 85.60 mm×53.98 mm×0.76 mm may be trimmed 2.5 mm on each horizontal side, although the amount of trimming and the size of the card is dependent upon the device that it is to be put in. Other standard smart card sized listed in ISO/IEC 7810:2003 are 25 mm×15 mm×0.76 mm; 105 mm×74 mm×0.76 mm; 125 mm×88 mm×0.76 mm. The example modified smart card component 40 is primarily designed to improve the testing method for known smart cards, but could be used in commercial applications if so desired.

In another example, the trimmed edges 41, 42 may extend across the entire horizontal edge of the modified smart card component 40 (not shown), rather than just the horizontal portion bordering the contact plate 44.

FIG. 5 shows another example modified smart card component 50. In this example, the horizontal edges 51, 53 are trimmed by 2.5 mm each relative to the prior art smart card of FIG. 3. The vertical side 55 that is nearest the contact plate 57 is also trimmed, in this example, by 2.0 mm. Again, the amount of trimming may vary depending on the application. Thus, all three shaded areas 32, 34, 37 shown in the prior art smart card 30 of FIG. 3 have been cut away.

Another device for integrating a smart card and a battery in one unit involves a conventional smart card 30 that is attached to a recess in a battery or battery emulator which, in turn, is attached to a modified smart card component 60. A modified smart card component 60 that is configured to receive the conventional modified smart card 30 of FIG. 3 is shown in FIG. 6, and the modified smart card 60 actually receiving the conventional smart card 30 of FIG. 3 is shown in FIG. 7.

Figure 6:
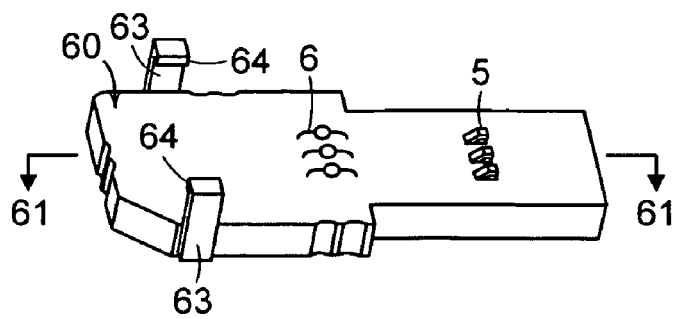
FIG. 6 shows a perspective view of an example modified smart card with means for receiving a smart card.
Figure 7:
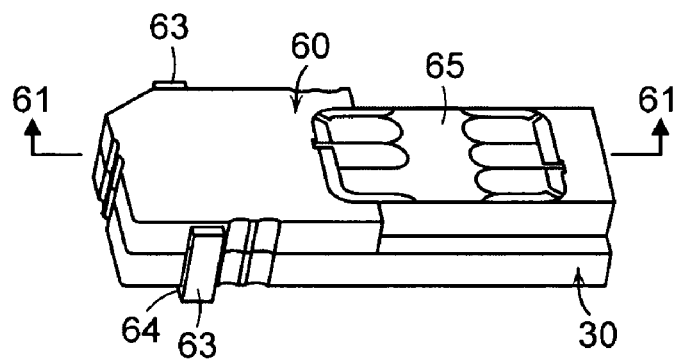
FIG. 7 shows a perspective view of the modified smart card of FIG. 6 receiving the conventional smart card of FIG. 3.

Referring to FIG. 6, a modified smart card component 60 has trimmed edges like the modified smart card component 50 of FIG. 5. In other examples, it could be trimmed like the modified smart card component 40 of FIG. 4 or have any other trimming that would prevent the smart card component from being lockingly retained in a smart card compartment. Furthermore, in this example, the modified smart card 60 has two protrusions 63 that are configured to receive a conventional smart card 30. The protrusions 63 may be made of metal or plastic or some other deformable but resilient material. The protrusions 63 have a ledge 64 on the end that is configured to fit over the edge of the conventional smart card 30 when the conventional smart card 30 is received into the protrusions 63. The axis 61 shows that FIG. 6 depicts a bottom view of the example modified smart card component 60. On the bottom side, there are smart card reader contacts 5, 6 that correspond to the smart card reader contacts 5, 6 in the smart card holder compartment 2 of the mobile device 1. When the conventional smart card 30 is received into the protrusions 63 of the modified smart card component 60, as shown in FIG. 7, the smart card reader contacts 5, 6 will be in contact with the contact plate 36 of the conventional smart card 30. This example modified smart card component 60 functions to relay the electrical signals from the contact plate 36 of the conventional smart card 30 to a similar contact plate 65 on the modified smart card component 60. This example modified smart card component 60 and conventional smart card 30 could be used with a battery emulator or a modified battery that has a recess for the conventional smart card 30 to fit into.

In other examples, the modified smart card component 60 could be attached to the conventional smart card 30 in other ways. For example, the conventional smart card 30 could have protrusions that allow it to receive the modified smart card component 60. The modified smart card 60 could also be more permanently attached to the conventional smart card 30, such as by gluing, soldering, or screwing each part together, among other means for attaching.

Figure 8:
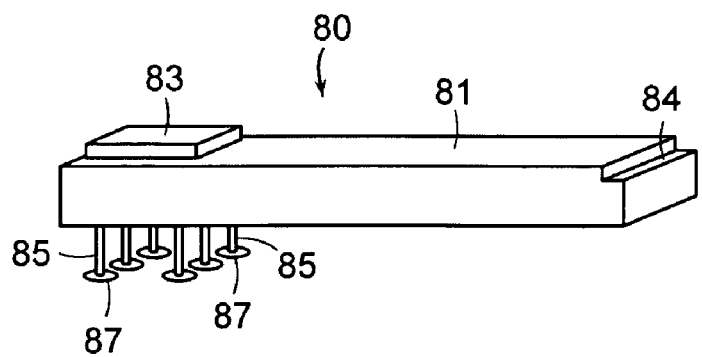
FIG. 8 shows a perspective view of an example modified battery component and smart card component apparatus.
Figure 9:
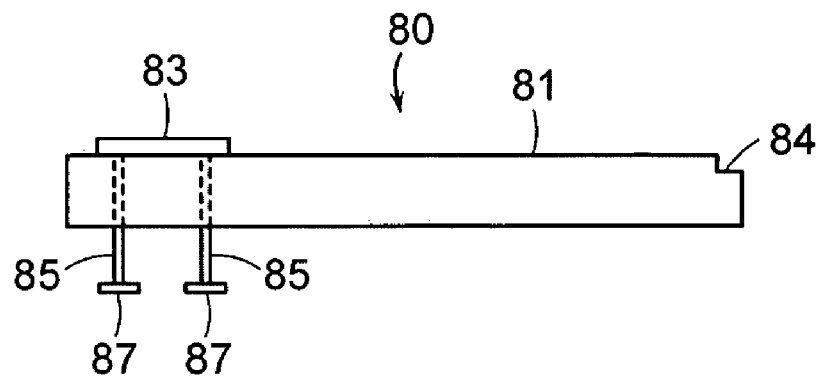
FIG. 9 shows a cross-sectional view of the example apparatus of FIG. 8.

Another example of a combined smart card component and battery component apparatus 80 is shown in FIGS. 8 and 9. In this example a smart card 83 is disposed on a top side of the battery component 81. The top side remains exposed when the apparatus is inserted in a battery compartment. Pins 85 are in contact with the smart card 83 and run through the battery emulator 81 to contact PCBs 87. (This is best depicted in FIG. 9.) In this example, there are two rows of three pins 85 connected to six PCBs 87.

Figure 10:
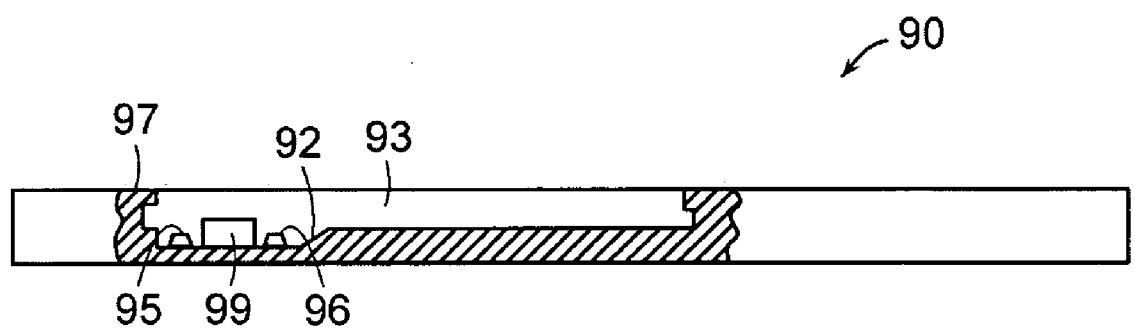
FIG. 10 shows a cross-sectional view of an example smart card containing device that uses a band to retain the smart card.

This apparatus 90 is particularly useful for the testing of newer smart card containing devices 90 like that shown in FIG. 10 that have a metal band 99 running around the smart card compartment 92 to hold a smart card in place, instead of the metal ridges 9 depicted in FIG. 2. When the apparatus 80 is placed in the battery compartment 93 of the device 90, the pins 85 straddle the metal band 99, and are long enough to reach down into the smart card holder compartment 97 and contact each of the smart card reader contacts 95, 96. The apparatus 90 may also be used in the example smart card containing device 1 shown in FIG. 1 by modifying the pins 85 and PCBs 87 to line up with the smart card reader contacts 5, 6 of the example device 1.

Another apparatus 101 that is particularly useful for the newer type of smart card containing devices 90 (see FIG. 10) is shown in FIGS. 11-13. This apparatus 101 is a battery emulator with a smart card 103 attached to it. The battery emulator 101 has two parts 101a and 101b that are connected by two cylinders 105, 106.

An arm 107 extends from the first part 101a of the apparatus 101. The arm includes a smart card holder 109 that holds a smart card component 103. The smart card holder has contacts that connect the contact plates of the smart card 103 to pins 111 that extend through the arm 107 to contact interface PCBs 113 on the other side of the arm 107 (see FIG. 13). There are six pins 111 that contact six interface PCBs 113. When the apparatus 101 is positioned in the smart card containing device 150 (see FIG. 13), three PCBs 113 make contact with three smart card reader contacts 157 on two sides of the metal band 155 that is disposed in the smart card compartment 153. The PCBs 113 extend far enough to reach the smart card reader contacts 157 without being impeded by the metal band 155.

A second arm 121 extends from the second part 101b of the apparatus 101. The second arm 121 includes battery contacts 123 that are configured to line up with and contact the battery contacts 159 of the smart card containing device 150. In this example, pins 125 extend from the second part 101b and enter the second arm 121 to connect with the battery contacts 123 inside the second arm 121.

The two parts 101a and 101b can be pulled away from each other so that they move approximately 5 mm apart. This telescoping movement allows the apparatus 101 to be pushed down into the battery compartment 151 and smart card compartment 153 of a smart card containing device 150 in a closed position with little or no resistance from the edges of the compartments 151, 153. The apparatus 101 can then be pulled apart into an open position to lock the apparatus 101 into the smart card containing device 150. A lever (not shown), when switched, will release the lock and allow the apparatus 101 to return to the closed position and be pulled out of the device 150.

A typical manufacturing testing process for devices containing smart cards includes a first test where several printed circuit boards are manufactured on a single panel and are tested to make sure they are functioning properly. The panel is broken into several individual circuit boards and assembled into the device. Then the keypad, display, antenna power, and telephone calling capability are tested. For this phase of testing, the battery and smart card are utilized to give power and communication capability to the device. Examples are given below of how the example devices described above are used to speed up the process of inserting and removing the smart card and battery.

In one example method, the combined battery and modified smart card apparatus 19 of FIGS. 1-2 is inserted in an angled, rotating motion into the smart card holder compartment 2 and battery compartment 3, as shown in FIG. 2. The tests are performed, and the combined battery and modified smart card apparatus 19 is removed by rotating it up out of the battery compartment 3 and sliding it out from the tabs 21 at an angle. Other types of motions may alternatively be used. It is not necessary for the battery and smart card to be inserted under tabs or protrusions. The modified smart card component 12 fits into the smart card compartment 2 at the same time the battery (or battery emulator) component 10 fits into the battery compartment 3. This has the advantage of decreasing the time it takes to insert and detach the battery and smart card, and results in a faster testing procedure. In the example apparatus 80 of FIGS. 7-9, a similar method is used to expedite the testing process of the FIG. 10 smart card containing device 90.

In an example method using the example devices of FIGS. 11-13, the apparatus 101 is in the closed position and is inserted in a single direction motion or an angled or rotating motion. An example of a single direction motion is to be inserted and removed vertically into the battery compartment 151 and smart card compartment 153 of the smart card containing device 150. The two parts 101a and 101b are then pulled apart, locking the apparatus 101 into place. Tests are performed and the apparatus is then unlocked, in this example by a lever (not shown), and returned to the closed position. The apparatus is then removed from the smart card containing device 150.

If the device passes all the tests satisfactorily, the device will be completed by loading software. The completed device is then labeled and packaged for sale. A smart card may or may not be packaged with the device. The example combined battery and modified smart card apparatuses 19, 80, 101 save time and steps within presently known manufacturing processes.

SIM, RUIM, and USIM are known types of smart cards that are readily identifiable. However, the claims are not limited to these types of smart cards. In fact, the teachings of this disclosure can be applied to any device that has a smart card compartment that is in communication with a battery compartment. Thus, the claims cover not only currently known and readily identifiable smart cards, but also smart cards that are not specifically identified or are yet to be developed. The claims are also not limited to smart cards that work with the network types that the named smart cards are operable with, GSM, CDMA2000, and UMTS. The claims also cover smart cards that are operable with networks that are yet to be developed.

The term "substantially" is used herein as an estimation term.

While various features of the claimed invention are presented above, it should be understood that the features may be used singly or in any combination thereof. Therefore, the claimed invention is not to be limited to only the specific examples depicted herein. The scope of the disclosure is accordingly defined as set forth in the appended claims.

What is claimed is:

1. An apparatus for testing the functionality of a smart card containing device having a recessed battery compartment and a recessed smart card compartment separate from the battery compartment, said recessed smart card compartment being sized for receiving a production smart card having a length and a width such that the production smart card is captured inside the smart card compartment during use via one or more projections that vertically block part of the opening of the smart card compartment, with said projections allowing a production smart card to be captured in the smart card compartment, said smart card compartment being positioned inside the battery compartment, the apparatus comprising:
 a housing comprising:
  a battery component; and
  a test smart card component positioned on one of an exterior surface of the battery component or on the housing and extending outwardly from the exterior surface thereof, said test smart card component having a length and a width,
 wherein at least one of the length and width of the test smart card component has a size that is reduced relative to the dimensions of the production smart card such that the test smart card component is receivable in one of a vertical or an angled, rotating motion into the smart card compartment such that the test smart card does not engage the one or more projections in the smart card compartment as it is received into the smart card compartment, and the battery component has a size and shape that is receivable in one of a vertical or an angled, rotating motion into the battery compartment substantially simultaneously with the insertion of the test smart card component.

2. The apparatus of claim 1, wherein the test smart card component has a portion of its outer edge that is trimmed relative to a size of the production smart card.

3. The apparatus of claim 1, wherein the test smart card component is positioned on the housing such that electrically conductive pins extend from the test smart card component through the housing for contacting the smart card compartment.

4. The apparatus of claim 1, wherein the battery component is a battery emulator.

5. The apparatus of claim 1, wherein the test smart card component has four outer edges and one or more of the outer edges are trimmed relative to the size of a production smart card.

6. The apparatus of claim 1, wherein the test smart card component is dimensioned so as to not be lockingly retained within the smart card compartment.

7. The apparatus of claim 1, wherein the test smart card component has multiple edges and at least some of the edges are trimmed relative to the size of a production smart card.

8. The apparatus of claim 1, wherein the test smart card component is fixedly attached to an exterior surface of the battery.

9. The apparatus of claim 1, wherein the test smart card component is attached to an exterior surface of the housing and electrical contacts extend through the housing and form electrical pads for coupling with the smart card compartment.

10. The apparatus of claim 1, wherein the test smart card component is one of a SIM card, a USIM card, or a RUIM card.

11. The apparatus of claim 1, wherein the test smart card component has means for receiving another smart card component.

12. The apparatus of claim 1, wherein the smart card compartment is configured to retain a production smart card having a plurality of edges by at least one of the plurality of edges.

13. The apparatus of claim 1, wherein the battery is a battery emulator having a first arm and a second arm, with the first and second arms being movable relative to one another such that the battery emulator may be pushed down into a battery compartment with little or no resistance, with the second arm including battery contacts for cooperating with the battery compartment.

14. The apparatus of claim 1, wherein the housing is a frame that houses the battery component and the smart card component, with the frame having at least a first part and a second part that are movable relative to one another to assist in locking the apparatus into the battery compartment of a smart card containing device.

15. The apparatus of claim 1, wherein the housing is a battery having a battery component, and the smart card component is coupled to the battery.

16. A method for testing the functionality of a smart card containing device in a manufacturing setting, with the smart card containing device having a battery compartment for receiving a production battery and a smart card compartment that is separate from the battery compartment and that has one or more projections that extend inwardly into the smart card compartment for capturing a separate production smart card, the method comprising:
 providing a combined battery and smart card apparatus comprising a housing that comprises a battery component and a test smart card component positioned on one of an exterior surface of the battery component or on the housing, said test smart card extending outwardly from the exterior surface, with the test smart card component having a size that includes a length and a width that is reduced relative to at least one of a length and a width of a production smart card to allow the battery and test smart card apparatus to be inserted in one of a vertical or an angled, rotating motion into the battery compartment and smart card compartment of a device substantially simultaneously such that the test smart card avoids being captured by the one or more projections during insertion;
 inserting the apparatus into the battery compartment and smart card compartment using one of a vertical or an angled, rotating motion;
 testing the smart card containing device by running at least one test thereon; and
 removing the apparatus from the smart card containing device.

17. The method of claim 16, wherein the housing of the apparatus includes a first arm and a second arm that are movable relative to one another, and the method further comprises pulling the first arm apart from the second arm to lock the apparatus into the smart card containing device.

18. The method of claim 16, further comprising loading software onto the device, labeling the device, and packaging the device for sale.

* * * * *